United States Patent
Ogasawara et al.

[19]

[11] Patent Number: 6,016,397
[45] Date of Patent: *Jan. 18, 2000

[54] METHOD AND APPARATUS FOR COMPILATION OF A DATA PARALLEL LANGUAGE

[75] Inventors: Takeshi Ogasawara, Setagaya-ku; Hideaki Komats, Yokohama, both of Japan

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/570,996

[22] Filed: Dec. 12, 1995

[30] Foreign Application Priority Data

Dec. 15, 1994 [JP] Japan .................................. 6-311764

[51] Int. Cl.⁷ ........................................................ G06F 9/06
[52] U.S. Cl. ............................................................ 395/706
[58] Field of Search .................................... 395/706, 705, 395/709, 800.18; 712/18

[56] References Cited

U.S. PATENT DOCUMENTS

| | | | |
|---|---|---|---|
| 5,067,068 | 11/1991 | Iwasawa et al. | 395/650 |
| 5,088,034 | 2/1992 | Ihara et al. | 395/700 |
| 5,202,995 | 4/1993 | O'Brien | 395/700 |
| 5,230,053 | 7/1993 | Zaiki | 395/700 |
| 5,274,812 | 12/1993 | Inoue | 395/700 |
| 5,274,818 | 12/1993 | Vasilevsky et al. | 395/700 |
| 5,317,743 | 5/1994 | Imai et al. | 395/700 |
| 5,481,723 | 1/1996 | Harris et al. | 395/700 |
| 5,586,325 | 12/1996 | MacDonald et al. | 395/706 |

*Primary Examiner*—Alvin E. Oberley
*Assistant Examiner*—Sue Lao
*Attorney, Agent, or Firm*—Scully, Scott, Murphy & Presser; Jay P. Sbrollini, Esq.

[57] ABSTRACT

A loop having an index set that can be distributed but with data dependency on the right side of an assignment expression that is indefinite can be parallelized. The index set of the loop is distributed to a plurality of processors. A processor set that uses values that are defined before the loop and a processor set using values defined after the loop is calculated. Code is interpolated that enables these processors to engage in communication before and after loops, thereby eliminating communication between processors in the loop and improving the execution speed of the program.

33 Claims, 3 Drawing Sheets

METHOD AND APPARATUS FOR COMPILATION OF A DATA PARALLEL LANGUAGE

DETAILED DESCRIPTION OF THE INVENTION

1. Field of the invention

The present invention relates to a method for parallelizing loops in a compiler for a data parallel language, and, more particularly, for assigning loops in a program to a plurality of processors for parallel execution.

2. Description of the Relevant Art

In recent years, data parallel languages and associated compilers have been developed. In a data parallel language, an array is partitioned into a plurality of subsets each assigned to a particular processor for execution. An example of code generated by a compiler of a data parallel language is single-program multiple-data (SPMD) code wherein the same code is executed by each of the processors. The present invention is concerned with the technology related to the compiler of a data parallel language.

Generally, compilers of a data parallel language perform a loop parallelization function such that each processor is enabled to read data required for the execution of the loop prior to the execution (communication extrapolation), thereby enabling the execution of the loop with minimum communication and synchronization between processors. In performing the loop parallelization function, it is important that the compiler generates code that maintains data dependency. Typically, the compilers generate code that maintains such data dependency by analyzing, for a given processor, when the given processor defines data and when such data is read by other processors.

Data-parallel compilers that generate SPMD code commonly follow the policy called "owner-computes" wherein processors that write data to a left-hand-side (LHS) operand must evaluate right-hand-side (RHS) operands and an expression in an assignment statement. A LHS operand and a RHS operand may be decomposed and distributed arrays. Thus, a RHS operand may be owned by a processor different from the processor(s) that owns the LHS operand and needs the RHS operand for evaluation. In such a situation, following "owner-computes", the processor(s) that own the LHS operand must communicate with those that own the RHS operands before evaluation. It is important for the compilers and supporting run-time libraries to decide which processors should communicate with one another.

Most of computation of scientific applications is done in loops. Therefore, the key in optimizing such applications is to reduce the computation time of loops. The loops contain assignment statements that consist of arrays decomposed and distributed among processors. Naive SPMD code that loads contents of operands from remote processors whenever an expression is evaluated performs badly because communication is much slower than computation. The compiler preferably should generate code that prefetches all the data accessed during execution of a loop.

In a data parallel language, an index set (or "Local Iteration Set" (LIS)) is a set of values assigned to the processors of the system. The index set preferably is computed after "Local Write Set (LWS). The process of assigning the values to the processors is referred to as distribution of the index set. The index distribution is based on the principle that the left side of an assignment expression is occupied by the index set itself as long as each processor executes the loops in the index set. Consider the region of LHS array accessed during execution of a loop. It can be decomposed by the decomposition of the array. For example, assume that a(1 . . . 99) is the region of LHS in a loop and the array is decomposed among processors in the block style such as a(1 . . . 10), a(11 . . . 20), a(21 . . . 30) and so on. In the case, processor 0 writes to a(1 . . . 10). The set of the array regions is called LWS. Each member of LWS can be mapped to an iteration space of the loop. Using the same example, additionally assume that the array's subscript and whole iteration space are a(i−1) and 'do i=2,100' respectively. The LIS of processor 0 with LWS of a(1 . . . 10) is 'do i=2,11'.

The generation of code that provides for the parallel execution of loops requires first that the index set can be distributed. The following loop is an example in which the index set cannot be distributed:

```
do i = 1, 10
    a(b(i)) = ...
enddo
```

In the aforementioned example, array b(i) is different from array a. In such a case, it is not determined what value array b(i) assumes with respect to i=1 . . . 10 at compile time. Thus, a compiler cannot distribute the index set to a plurality of processors.

The generation of code that provides for the parallel execution of loops also requires that data dependency of the loops be definite, or in other words, that all of the communication generated on the right side of the assignment expression of each loop body can be carried out outside of the loops. Typically, to determine whether or not the data dependency of a loop is definite, an analysis is made as to which portion of the array region on the right side read by the index set is held or not held by a given processor.

The following loop is an example of a loop having an indefinite data dependency:

```
do i = 5, 10
    a(i) = .. a(m) ..
enddo
```

In this example, a compiler cannot determine whether the value for a(m) that is used in the portion of a(i)=. . . a(m) . . . which is an assignment portion in a certain repetition is before or after the definition by the loop. In such a case, since the data dependency is indefinite, the loop is commonly referred to as "having a plurality of data dependencies."

In summary, the generation of code that provides for the parallel execution of loops requires that the following two conditions be met at compile time:

(1) the index set can be distributed; and
(2) the data dependency of the right side of the assignment expressions of the loop is definite.

For simplicity, the two conditions are referred to below as condition (1) and condition (2), respectively.

The following publications provide background material related to loop parallelization function performed by compilers of a data parallel language.

PUPA 61-182161 discloses a multi-processor calculation system which has a plurality of CPUs and a plurality of memories as basic components. The system comprises a stream path connected in a loop to each of the processors, and a means for receiving messages in a definite direction relative to the stream bus whereby one unit of processing proceeds while sending a message to each of the processors.

PUPA 4-184540 discloses a compiler for generating an object program from a given source program to a parallel calculation system comprising a plurality of processors that can execute programs in parallel. More specifically, the source program is literally decomposed and analyzed, the syntax is recognized based on the result of the analysis to generate an intermediate code, a loop structure is detected from the intermediate code to extract a parallel executable portion, the data reference relation is analyzed with respect to each loop when the loop is a multiple loop, and parallel execution processing is performed with a loop in which no data reference relation is generated between loops.

PUPA 5-153895 discloses a parallel calculation system in which a plurality of calculators are connected. In addition, a plurality of continuous loop calculations in the loop calculators is shared which has dependency relations including the referencing of values between loops to communicate data required for other calculators to other calculators with the dependency relationship.

PUPA 5-324345 is concerned with a method for dividing subscripts in loop expressions in a source program when the loop calculations are mutually free from the effect of the calculations even with the data division is divided into each cell of parallel calculators and processed. The method comprises the steps of:

- determining a data distribution form as to whether all of the data of a plurality of data calculated in a loop sentence is distributed to each cell of a parallel calculator in advance or the plurality of data is finely divided and distributed;
- generating subscript sentences for designating loop calculations shared by each cell in correspondence to a division form of loop sentences and the data distribution form;
- selecting loop sentences processed in parallel from a source program; and
- selecting the subscript sentences in accordance with a descriptor for specifying the division form of loop sentences in accordance with the data distribution form when the source program is converted to an intermediate program by adding the descriptor before thus selected loop sentences.

However, the prior art cannot execute loops in parallel unless both of conditions (1) and (2) are met. For example, consider a program having the following loop:

subroutine sub (a, n, m)

integer a(n)

distribute a(block(n / number_of_processors ()))

do i = 1, n a(i) = a(m)

enddo end

In this example, the subroutine "sub" is described in accordance with high-performance Fortran syntax. More specifically, the third line which begins with "distribute" is an expression that causes the array "a" to be distributed with respect to the current processor configuration, which is defined by "number_of_processors ( )". For convenience, "number_of_processors( )" is abbreviated as np( ) below. The number of array elements possessed by each processor is n/np( ), which is described below as ne. A distributed index set {1,2, . . . ,n} is set to {(p−1)*ne+1,(p−1)*ne+2, . . . , min(n,p*ne)} with respect to processor p. Such numbers as ne=n/np( ) and n are not constant. In this case, condition (1) is met when possible. However, since this loop has a plurality of data dependencies, condition (2) is not met.

In actuality, as described below, the prior art generates code that decreases the speed of processing with respect to the loop which meets condition (1) but which does not meet condition (2).

Moreover, SPMD code for a loop which is not parallelized and which does not meet conditions (1) and (2) will now be explained. With respect to a loop which does not meet condition (1), the index set is not distributed. Thus, there is a possibility that all of the processors executing the SPMD code execute, in the loop, assignment expressions which are written to an array region which is not held by the processors when no operation is done. To prevent this, compilers generate code which encloses assignment expressions in an IF statement (referred to as a processor guard) and which does not execute assignment expressions in writing array elements which are not held by the compilers themselves.

Moreover, when condition (2) is not met, condition (1) is not met because in distributing index sets each processor executes loops with different index sets without mutual interference. In such a case, the holding processor cannot determine that a certain processor requires the right side in the execution of loops. This is because the processor cannot send a value. Furthermore, the holding processor cannot determine at which time a value to be sent is located in the execution of the program. On the other hand, when condition (1) is not met, the holding processor cannot determine the array region which each processor accesses on the right side throughout the complete execution of loops. Consequently, because each processor cannot read the array region as a group outside of the loop, SPMD code is generated which is communicated in the loop. Quasi-SPMD code for specifically reading the i-th right side of each of the original assignment expressions may be generated as follows with LHS being set as the left-side operand, RHSi as the i-th right-side operand, and #T as a temporary variable:

```
        then which does not possess if LHS
                then which possess if RHSi
                    a value for RHSi is transmitted to LHS
                endif
            endif
        then which holds if LHS
        then which holds if RHSi
                #T=RHSi
        else
                #T=receiving a value for RHSi from the
                holder of RHSi
            endif
        endif
```

In the evaluation of the right side of assignment expressions, #T is used in place of RHSi.

Similarly, SPMD code may be generated when condition (2) is not met. For example, DOSYNC loops may be generated when the index set is not distributed data is communicated in the loop. Such DOSYNC loops are slow compared to loops in the processor(s) reads from memory for three reasons: first, the receiving side processor is forced to wait when the execution of the sending-side processor is delayed that results, for example, from unequal load in the fetching of operands; second, there is execution overhead for executing the communication functions; and third, there may be a prolonged time until the transmission data is received, particularly in the case of distributed-memory multiple processors. Consequently, DOSYNC loops determine and delay the execution speed of the program and thus dictate the performance of the compiler.

It is therefore an object of the present invention to provide a method for generating code that enables high-speed processing in parallel loops in which condition (1) is met and condition (2) is not met.

SUMMARY OF THE INVENTION

To achieve the objects in accordance with the purposes of the present invention, as embodied and described herein, a method and apparatus for compilation of a data parallel language may be utilized in a compiler that generates code for a computer system having a plurality of processors. The method and apparatus generates such code by dividing loops in a source program among the plurality of processors so as to execute the loops in parallel. The method and apparatus divides such loops by:

(a) reading the source program;

(b) locating a loop wherein an index set associated with the loop can be distributed among the plurality of processors and wherein data dependency of a right side of an assignment expression within the loop is indefinite;

(c) for the loop located in step (b), if an index variable associated with the loop is of a predetermined type, determining at least one condition relating to the assignment expression;

(d) calculating a receiving processor set in accordance with the determination made in step (c); and (e) generating code for communicating data to the receiving processor set in accordance with the receiving processor set calculated in step (d).

In addition, pipelined code may be generated for each of the plurality of processors according to the determination made in step (c). Preferably, the source program is written in FORTRAN, and includes a code for specifying the number of processors and the method for dividing such loops.

DESCRIPTION OF THE EMBODIMENTS OF THE PRESENT INVENTION

In the parallelizing of loops, on the one hand, compilers generate code that is communicated as a group outside of the loops based upon the static data dependency of the loops. In the presence of a factor which does not meet condition (2) such that the data dependency might not be definite, compilers cannot parallelize the loops even if condition (1) is met. Loops which cannot be parallelized include the case in which a loop-invariant variable is held as a subscript in the array.

However, on the other hand, when condition (2) is not met only because a loop-invariant variable appears as a subscript in the array, the variable can be treated as a constant in execution. Thus, data dependency is definite in this case. Consequently, all of the types of data dependency which extend over processors at execution time can be determined at compile time. Moreover, if the communication code can be generated outside of the loop and this code can guarantee the receiver and sender for any data dependency, data reading through communication can be taken out of the loop. Thus, the loop can be executed in parallel. This optimization expands the scope of the loop parallelization function with respect to conditions (1) and (2). On the basis of such an idea, the present invention generates code for parallelizing loops based on data dependency which is definite in execution.

Consider an example of a simple loop having a one-dimensional array and a single right-hand side operand as follows:

$$do\ i = M,\ N$$
$$S1: h\quad a(i) = a(x)$$
$$enddo$$

Here, array a is declared from a(1) to a(MAX). Symbols such as M, N, and x are variants of integers. In addition, assume that array a is distributed in an orderly fashion in a block-like configuration in the Pn one-dimension processor array (each possesses holds ne=MAX/Pn elements). Namely, processor p holds a portion from $a(1+(p-1)*ne)$ to $a(ne+(p-1)*ne)$ in sequence. Although the loop is simple, it is an example in which the present invention can be explained.

The simple loop set forth above meets condition (1). Namely, the index set can be distributed, whereas processor p executes the loop in index set $i=1+(p-1)*ne$: $ne+(p-1)*ne:1$ (one branch from $1+(p-1)*ne$ to $ne+(p-1)*ne$) (the description of a:b:d refers to an index set which begins with a and reaches b by incrementing by d. However, the simple loop does not meet condition (2). This is because processor p requires right side a(x), but it is not clear whether the value to be read is a value before the execution of assignment expression S1 in the loop of the holder of a(x) or a value after the execution thereof. Thus, the data dependency of the loop varies in two ways specifically depending on the relation among x, M, and N will be described hereinbelow.

Case 1: when x is either smaller than M or larger than N, or when x is smaller than M or larger than N, a(x) cannot be defined in this loop. In other words, value a(x) used in assignment expression S1 is a value before the loop execution in any processor.

At the time of execution, before loop execution, a processor holding a(x) sends a(x) to other processors, whereas other processors receives a sent value. Then, once synchronized, processors can execute the loop in the index set distributed in a mutually independent manner.

Case 2: when x is not less than M and not more than N, a(x) is redefined. The value of a(x) used in the assignment expression is given as a value of a(x) before the execution of the loop in the portion of index set x:M:1 whereas the same value of a(x) is a value of a(x) after the execution of the loop in the portion of index set x+1:M:1.

When this is considered in the aforementioned distributed index set, processors 1 through 1+(x−1)/ne (a(x) holding processor) use the value of a(x) before the loop execution as a value of a(x) in assignment expression S1 whereas processor 2+(x−1)/ne through processor p uses a value of a(x) after the loop execution as a value of a(x) in the expression S1. At the time of execution before loop execution, processors holding a(x) send a(x) from processor 1 to processor (x−1)/ne, whereas processor (x−1)/ne receives thus sent a(x) from processor 1. After this communication synchronization, processors 1 through 1+(x−1)/ne can execute the loop in the mutually independently distributed index set. Then, after loop execution, a(x) holding processors send a(x) from processor 2+(x−1)/ne to processor p whereas possessor processor p receives the value of a(x) sent from processor 2+(x−1)/ne. After this communication synchronization, processors 2+(x−1)/ne through p execute the loop in the mutually independently distributed index set.

As described above, because the loop meets condition (1) at compile time and meets condition (2) at execution time, the designed code enables the parallelization of the loop. The present invention provides a technique for optimizing compilers for generating code for carrying out communication which covers possible data dependency by finding loops which meet condition (1) at compile time and which meet condition (2) at execution time. More specifically, as executed in the case classification of the parallelization of the simple loop described above, loop-invariant variables in the array subscript which cause a plurality of data dependencies and the upper limit and lower limit of index variables are used as parameters to constitute code for executing pipelines for the parallelization of the loop through the execution of pipelining. This is referred to as the pipelining of the innermost loop.

Pipelining of the innermost loop has the following advantages:

(a) Reduction in the number of communications by disposing communication outside of the loop;

(b) Removal of communication synchronization in the loop by communication extrapolation; and (c) Unrequited assignment guards by the divided index set.

To take an example of the standard loop, the advantage of the present invention lies in that the standard loop carries out communication of a(x) (N−M+1) times in the loop which is not subjected to loop parallelization, whereas the improved loop of the present invention carries out communication only once outside of the loop. The type of communication is one-to-one from the a(x) holding processor to a(i) holding processor on the left side for the loop which is not subjected to loop parallelization, whereas the improved loop of the present invention is one-to-multiple communications from the a(x) holding processor to all of the processors that carry out assignment of the left side. The advantage of the present invention can be summarized as follows:

TABLE 1

| | Before parallelization | After parallelization |
|---|---|---|
| Communication times | N−M+1 | The number of processors which execute assignment without holding a (x) |
| Number of synchronization within the loop | N−M+1 | 0 |

The synchronization required in the loop will not be needed irrespective of MAX, M, N, and Pn. As described above, because synchronization slows down the execution of the loop through communication carried out in the loop, the absence of synchronization induces a very large-degree increase in the speed of execution. In addition, the time of communication is also decreased, although the number of processors which execute assignment without holding a(x) depends on MAX, M, N, and Pn. The number of processors can be decreased by a factor of about 1/ne (an inverse of the number of array elements that can be distributed in one processor) in the step following the parallelization of the loop as compared to the step preceding the parallelization. The overhead of the communication library can be decreased by a factor of about 1/ne.

For example, consider the case where MAX=10000, M=1, and N=10000. In this case, the simple loop can be an assignment to the whole array. In addition, when Pn=2000 sets are established, all of the 2000 sets of processors will be engaged in assignment by loop execution. The concrete values in the aforementioned table will then be as follows, where the table shows that the present invention can be extremely advantageous:

TABLE 2

| | Before parallelization | After parallelization |
|---|---|---|
| Times of communication | 10000 | 1999 |
| Number of synchronization in the loop | 10000 | 0 |

The present invention may be utilized for a multiple processor system which comprises a plurality of processors mutually connected so as to exchange data with each other. Multiple processor systems are typically classified into distributed-memory multiple processor systems such as that shown in FIG. 1 and shared-memory multiple processor systems such as that shown in FIG. 2.

Figure 1:
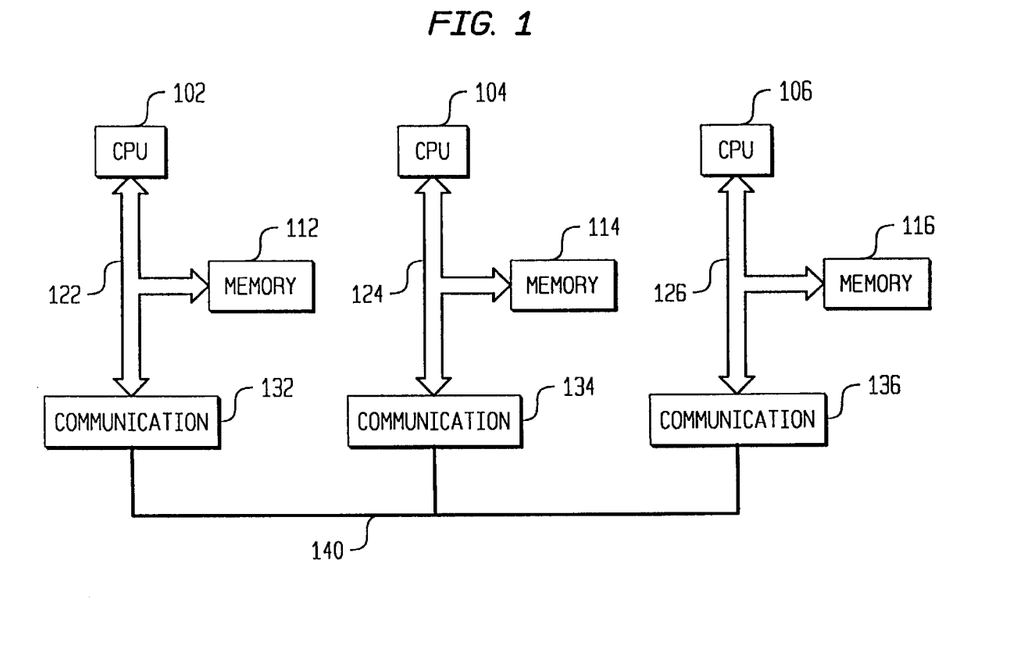
FIG. 1 is a block diagram of a distributed-memory multiple processor.

Referring to FIG. 1, a typical distributed-memory multiple processor system includes a plurality of processors (CPUs) 102, 104, 106 (three shown) connected to memories 112, 114, 116 via local buses 122, 124, 126, respectively. The local buses also connect the CPUs to a digital network 40 via communication devices 132, 134, 136. The digital network 40 is typically a local area network (LAN), but may be a wide area network (WAN) such as integrated services digital network (ISDN) and the like. Hence, in distributed-memory multiple processor systems, the number of CPUs that can be mutually connected is substantially infinite. Thus, such multiple processors enable the processing of matrix calculations having a huge array through the preferable formation of a program for distributed processing. However, in the distributed-memory multiple processor system, data is exchanged between CPUs through communication circuits such as the LAN or WAN, which may produce a load on the processing capability of the CPUs.

Figure 2:
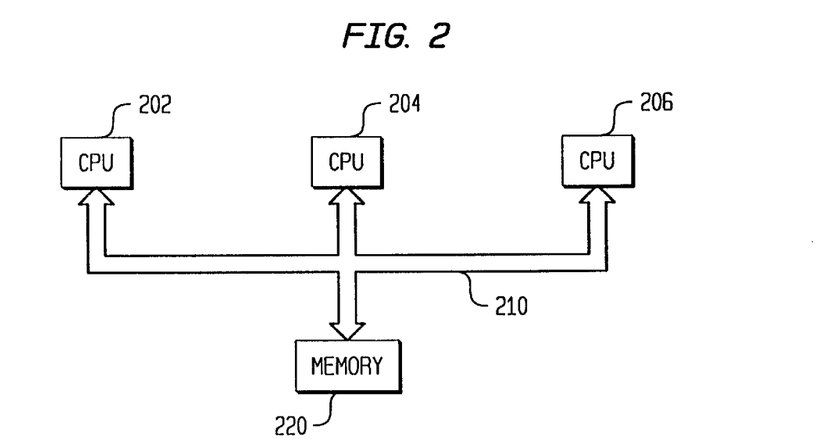
FIG. 2 is a block diagram of a shared-memory multiple processor.

FIG. 2 illustrates a typical construction of a shared-memory multiple processor system including a plurality of CPUs 202, 204, 206 (three shown) connected to a shared memory 220 via bus 210. The area of the shared memory 220 includes, for example, an exclusive area occupied by an individual CPU and a common area which is commonly accessed by a plurality of CPUs. An advantage of the shared-memory multiple processor system is that the communication cost between CPUs can be minimized because CPUs are mutually connected via a local bus. The number of CPUs that can be connected, however, in the shared-memory multiple processor system is limited because of the necessity of packaging a plurality of CPUs with respect to the shared bus in a limited housing and the necessity of the adjustment of access to the plurality of CPUs.

The present invention can be applied to any system wherein a plurality of CPUs communicate with one other without being limited by the connection form of CPUs such as the distributed-memory multiple processor system or the shared-memory multiple processor system.

Figure 3:
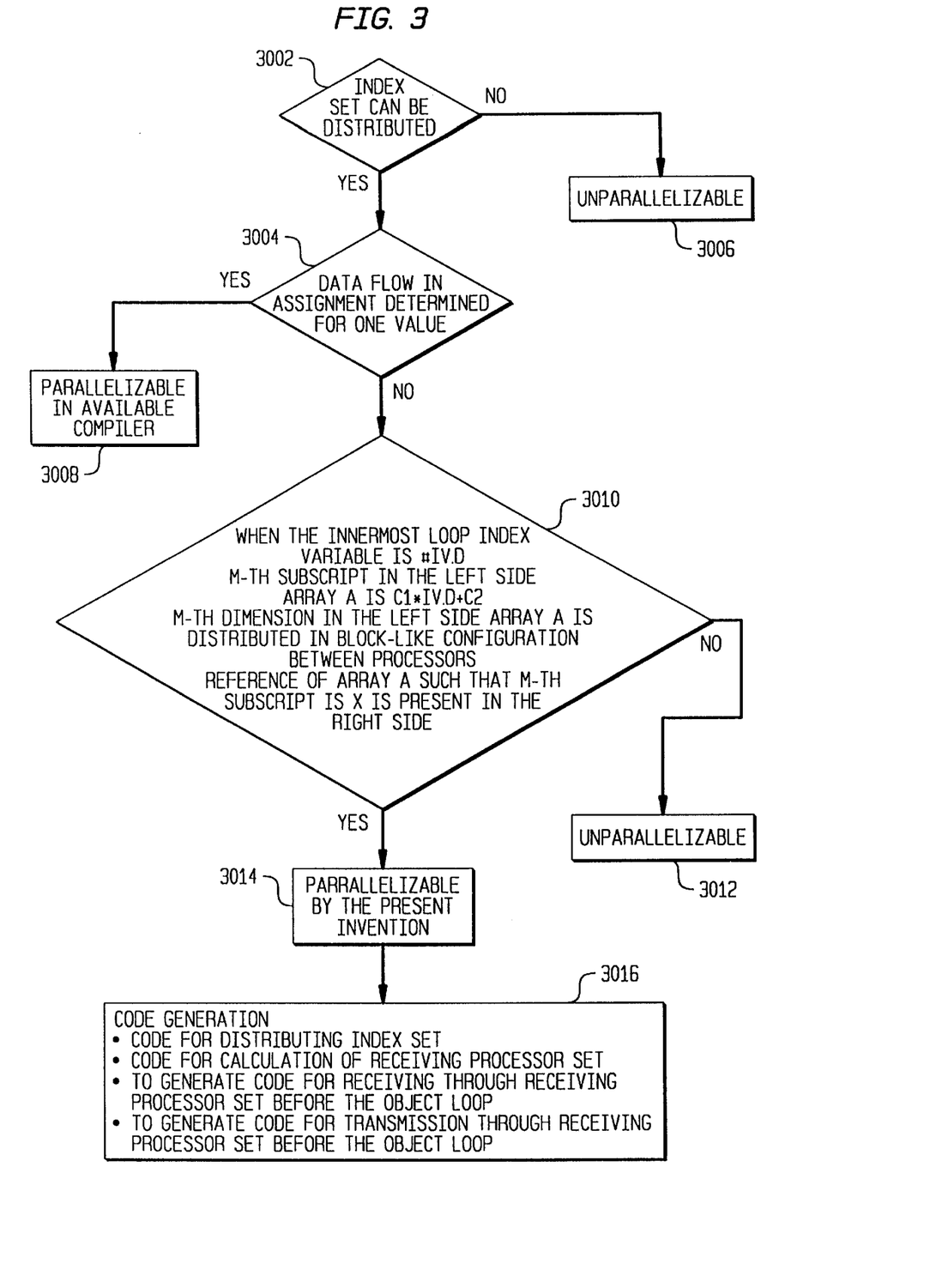
FIG. 3 is a flow chart showing the method of compilation of parallel loops according to the present invention.

FIG. 3 illustrates the method of compilation of parallel loops according to the present invention. The present invention is initiated when a compiler detects a loop in a source program.

At the outset, in step 3002, a determination is made as to whether an index set can be distributed with respect to an index of the loop (the innermost loop in the case of a nested loop). When a determination is made such that the index set cannot be distributed, processing proceeds to step 3006 wherein the compiler conducts conventional processing such as the insertion into the loop of code for communication between processors.

When a determination is made in step 3002 that the index set can be distributed, processing proceeds to step 3004 to determine whether a data flow for the assignment expression included in the loop is definite.

When a determination is made that the data flow is definite, processing proceeds to step 3008 because the loop can be parallelized with conventional compilers without using the present invention. In step 3008, a code is generated to parallelize processing between the plurality of processors with the conventional compiler technique.

When a negative determination is made in step 3004, processing proceeds to step 3010 to make the following determination. Namely, if the index variable in the innermost loop is set to #IV.d (wherein "#" indicates that the variable is an internal variable that only the compiler can use, "IV" indicates that the variable is a loop variable, and ".d" indicates that the variable is the d-th index variable of a nested loop), a determination is made as to whether the following three conditions are met:

(1) the m-th (m is an integer not less than 1 and not more than N) subscript in array a on the left side of the expression is c1*(#V1.d)+c2 (c1 and c2 are loop-invariable constants in the innermost loop, and c1 is not equal to 0);

(2) the m-th dimension in array a on the left side of the expression is distributed among a plurality of processors in blocks; and (3) m-th subscript expression x in array a on the right side of the expression is a variable whose value is indefinite at compile time, but subscript expression x is a variable whose value is invariant in the innermost loop at the time of program execution.

When it has been determined that any one of these three conditions is not met, processing proceeds to step 3012, where the parallelization of the loop is regarded as being impossible. In step 3012, as in step 3006, the compiler conducts conventional processing such as the insertion into the loop of code for communication between processors.

When a determination is made in step 3010 that all three conditions are met, in step 3014 a determination is made that the compiler can parallelize the loop according to the present invention in step 3016.

Figure 4:
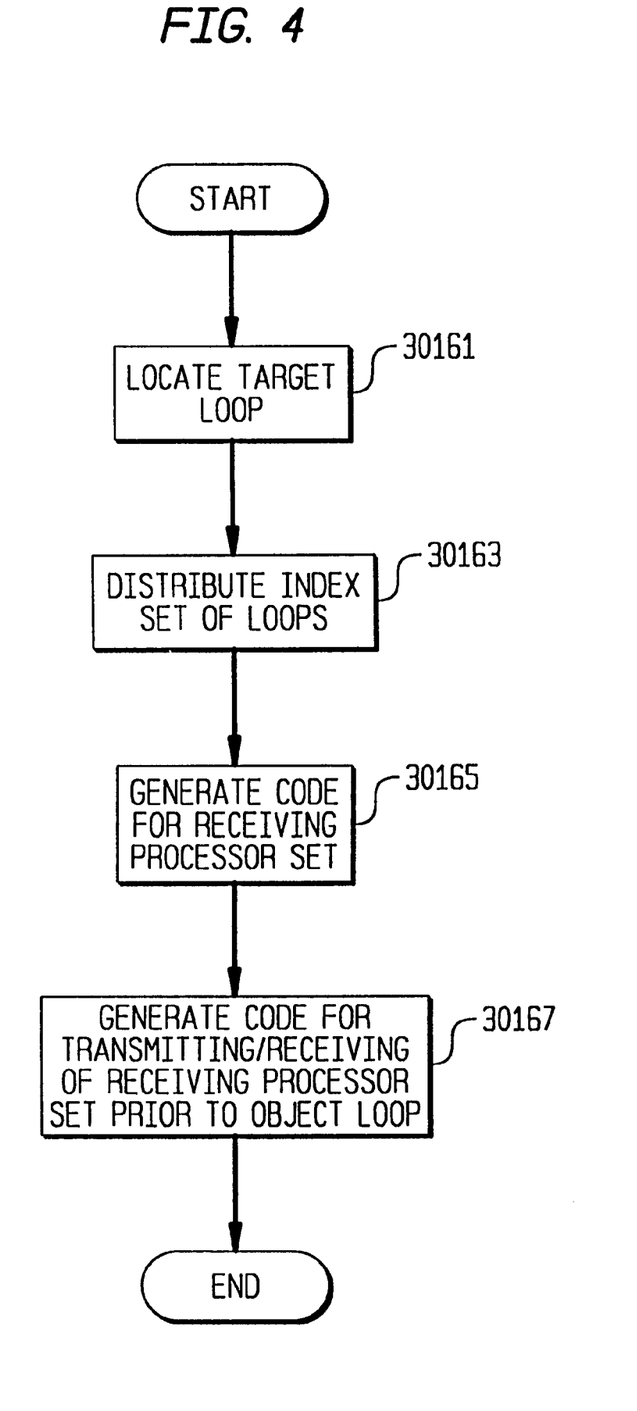
FIG. 4 is a flow chart showing the method of loop parallelization according to the present invention.

According to the present invention, in step 3016, the compiler carries out the following operation to pipeline the loop into an innermost loop as outlined in FIG. 4. After the pipelining of FIG. 4, the loop is normalized so that the loop begins with 1 and branch 1 (only the upper limit is considered with respect to the loop).

In step 30161, a target loop is located. A target loop is a loop which meets condition (1) at compile time and meets condition (2) at program execution time. More specifically, when the index variable in the innermost loop (if a single loop, itself) is #IV.d, the following conditions must be met:

(a) the m-th subscript in the array on the left side of an expression includes a*(#IV.d)+b, where a is not 0 and b is a loop invariant;

(b) the m-th dimension of the array on the left side of an expression is distributed in a block-like configuration between processors; and (c) the m-th subscript in the reference of the same array as the one on the right side and the left side includes x, wherein x is a loop-invariant expression.

When the m-th subscript in the array on the left side takes the form of a*(#IV.d)+b, condition (1) is met at compile time. When the m-th subscript expression in the same array as the right side is x, the innermost loop is equivalent to the standard loop considering the index variable in the loops outside of the innermost loop as fixed. When these conditions are met, the loop is a target loop.

In step 30163, the index set of the loop is distributed. Distribution of the index set is determined from the following three information items:

(a) the upper limit of the innermost loop;

(b) m-th subscript expression a*(#IV.d)+b; and (c) the manner of distribution.

More specifically, the distribution of the index set is determined as follows. At the outset, the upper limit of the innermost loop is set to UB. With the presence of subscript expression a*(#IV.d)+b, the execution of the innermost loop is accessed in a sequence such that a positive a branches from a+b to a*UB+b with respect to the m-th dimension on the left side, whereas a negative a branches from a*UB+b to a+b. A determination is made from information on the manner of division or information on processors for dividing, in a block-like configuration, the m-th dimension of the array on the least side, as to which scope which of the processors accesses when the m-th dimension on the left side is accessed. Furthermore, the scope accessed by each processor is determined by #IV.d=(subs_m-b)/a, which is an inversion function of subscript expression subs_m=a*(#IV.d)+b. The scope of the index variable for accessing the scope accessed by each processor is then determined. What is determined, then, is the distributed index set.

For example, take into consideration the normalized standard loop:

do i=1, N−M+1
a(i+I−1)=a(x)
enddo

In this case, array a(1:MAX) is distributed in a block-like configuration to Pn processors and held as such. Furthermore, subscripts including index variable in the innermost loop are subs=i+M−1 and an inversion function thereof is i=subs−M+1. The upper limit of the innermost loop is N−M+1. At the outset, the left side is accessed by one branch from M to N. Processors which hold a(1) and a(N) are set to P(M) and P(N), respectively. The index set is not distributed to processors from 1 to P(M−1) and processors from P(N)+1 to Pn. The index set is distributed only to processors from P(M) to P(N). Because each processor holds ne array elements, fractions are produced if M and N are not multiples of ne+1. The index set distributed to P(M) and P(N) then also becomes a fraction. In processors p from P(M)+1 to P(N)−1 during processing, the left side is accessed by one branch from I+(p−1)*ne to ne+(p−1)*ne.

Thus, the scope of the left side to be accessed for each processor is determined in this fashion. The index set which is accessed by inversion function i=subs−M+1 for each of the processors is then further determined. For example, in processor p from P(M)+1 to P(N)−1, the portion from 1+(p−1)*ne−M+1 to ne+(p−1)*ne−M+1 is the distributed index set.

Incidentally, the number of processors to be specified and the manner of division can be specified with a statement that begins with *hpf$ in the case of HPF. Otherwise, at the time of program execution, it is possible to determine that the number of processors and the manner of division are automatically determined by identifying the processor so that the program is given by a command line parameter or a specific module is connected.

A pointer to a data structure for holding an index set in which the upper limit of the innermost loop and the distributed index set is set to lis_ptr, a pointer to the data structure for holding the m-th subscript expression on the left side to subs_ptr, a pointer to a data structure for holding the manner of division on the left side to decomp_ptr, and the calculation of the index set thus distributed is preferably calculated in the execution library described as compute_lis. The execution library compute_lis may be called in the following manner:

call compute_lis (lis_ptr, sub ptr, decom_ptr)

In the aforementioned example, (i+M−1) is given to subs_ptr, information as to which value of array a on Pn processors have is given to decomp_ptr. Symbol lis_ptr is a pointer to information on the result of calculation of compute_lis, namely information in which the distributed index set for each processor is held in such a form as lb:ub:st.

In step 30165, the compiler generates code for calculating the receiving processor set of the loop. Generally, each processor is different as to whether in the innermost loop a value before definition is used or a value after definition is used. This depends on the subscript a*(#IV.d)+b, the manner of division x, and the value x.

Consider an example wherein "a" is positive. The m-th dimension on the left side is accessed by a branch from a+b to a*UB+b. In the case where mod(x−b, a) is not 0, or expressions such as a+b>x or a:UB+b<x are established, the expression cannot be defined in the loop. In this case, all the processors which execute the assignment on the left side of the expression are assigned to the processor set recv_pre (which identifies that a given processor uses a value before definition). In the case where mod (x−b, a)=0, or a+b<=x<= a*UB+b, the expression can be defined in the loop. In this case of a*ix+b=x, processors which have a portion of 1 to ix in the distributed index set use a value before the definition in the loop. Such processors are assigned to the set recv_pre. In addition, processors which have a portion of ix+1 to Ub in the distributed index set use a value after definition, and thus are assigned to the set recv_post (which identifies that a given processor uses a value after definition).

Consider another example wherein "a" is negative. On the one hand, the m-th dimension in the left side is accessed by a branch from a*UB+b to a+b. In the case where mod (x−b, |a|) is not 0, or expressions such as a*UB+b>x or a+b<x, such expressions cannot be defined in the loop. When the expression cannot be defined, all of the processors which execute the assignment on the left side of the expression are assigned to the processor set recv_pre. On the other hand, in the case of mod (x−b, |a|)=0, or a*UB+b<=x<=a+b, the expression may be defined in the loop. In the case of a*ix+b=x, processors which have a portion of UB to ix in the distributed index set use a value before definition in the loop, and thus are assigned to the set recv_pre. Processors which have a portion of ix−1 to 1 in the distributed index set use a value after definition in the loop, and thus are assigned to the set recv_post.

The sets recv_pre and recv_post may be summarized as follows:

(a) mod (x−b, |a|) is not 0
all of the processors which substitute the left side of the expression are assigned to recv_pre;

(b) mod (x−b, |a|) is 0, a is positive, and a+b>x
all of the processors which substitute the left side of the expression are assigned to recv_ore;

(c) mod (x−b, |a|) is 0, a is positive, and x>a*UB+b
all of the processors which substitute the left side of the expression are assigned to recv_pre;

(d) mod (x−b, |a|) is 0, a is positive, and a+b<=x<=a*UB+b
all of the processors which are associated with the portion of the index set from 1 to (x−b)/a are assigned to recv_pre;
all of the processors which are associated with the portion of the index set from ((x−b)/a)+1 to UB are assigned to recv_post;

(e) mod (x−b, |a|) is 0, a is negative, and a*UB+b>x
all of the processors which substitute the left side of the expression are assigned to recv_pre;

(f) mod (x−b, |a|) is 0, a is negative and x>a+b
all of the processors which substitute the left side of the expression are assigned to recv_pre;

(g) mod x−b, |a|) is 0, a is negative, and a*UB+b<=x<=a+b
all of the processors which are associated with the portion of the index set from (x−b)/a to UB are assigned to recv_pre;
all of the processors which are associated with the portion of the index set from 1 to ((x−b)/a)−1 are assigned to recv_post.

In the normalized standard loop, the values of a,b, and UB are set to a=1, b=M−1, UB=N−M+1, which results in the following:

cases (a), (e), (f), and (g) are impossible, and are therefore omitted.

(b) mod (x−M+1, |1|) is 0, 1 is positive, and 1+M+1>x
all of the processors which substitute the left side of the expression are assigned to recv_pre;

(c) mod (x−M+1, |1|) is 0, 1 is positive, and x>1*(N−M+1)+M+1
all of the processors which substitute the left side of the expression are assigned to recv_pre;

(d) mod (x−M+1, |1|) is 0, 1 is positive, and 1+M+1<=x<=1*(N−M+1)+M+1
all of the processors which are associated with the portion of the index set from 1 to x−M+1 are assigned to recv_pre;
all of the processors which are associated with the portion of the index set from x−M+2 to N−M+1 are assigned to recv_post.

Pointers to the data structures of recv_pre and recv_post are referred to as pre_ptr and post_prt, respectively. Such recv_pre and recv_post are preferably calculated in the execution library. Compute_pre-post may be called in the following manner:

call compute_pre_post (x, lis_ptr, subs_ptr. pre_ptr, post_ptr)

In step 30167, the compiler generates code for the transmitting and receiving of data by the processors of the receiving processor set prior to the object loop. More specifically, the index variable of the d−1−ple loop outside of the innermost loop can be regarded as fixed and x is definite. Thus, array element RHSx having x at the m-th dimension in the right-side array, which is the same as the left-side array, searches for the holding processor by using the information on the division of the array. The holding processor is referred to as px. Processor px sends RHSx to a processor registered in recv_pre (processor set which uses a value before definition in the loop) that has been determined before the innermost loop, and the processor registered in recv_pre receives RHSx. In addition, processor px sends RHSx to a processor registered in recv_post (processor set which uses a value after definition in the loop) that has been determined beforehand after the innermost loop, whereas a processor registered in recv_post receives RHSx.

A pointer to the data structure for holding a value of a loop index variable outside of the innermost loop is referred to as iv_ptr, whereas a pointer to the data structure for holding subscript information on all of the dimensions of RHSx is referred to as subs_all_ptr. Such communication is preferably exchanged in the execution library such as pre_send and post_send. Consequently, procedures such as pre_send and post_send may be called in the following manner:

call pre_send(iv_ptr, subs_all_ptr, pre ptr); call post_send (iv_ptr, subs_all_ptr, post_ptr).

The present invention may be use to generate an innermost loop pipelined quasi-SPMD code as follows, wherein lis.lb(p), lis.ub(p) is data in processor p in the data structure designated by lis_ptr initialized by compute_lis and are the lower and upper limit of the distributed index set:

call compute_lis (lis_ptr, subs_prt, decomp_ptr);
call compute_pre_post (x, lis_ptr, subs_ptr, pre_ptr, post_ptr);
call pre_send (iv_ptr, subs_all_ptr, pre_ptr);
do #IV.d=lis.ub(p), lis.ub(p)
    a( . . . , a*#IV.d +b, . . . )=a( . . . , x, . . . ) enddo;
call post_send(iv_ptr, subs_all_ptr, post_ptr)

In the aforementioned program, the portion from do to enddo is executed in parallel for each processor p, or at each processor p.

As described above, the present invention provides a compiler which can efficiently parallelize loops including expressions having the dependency on a plurality of data, which data dependency cannot be parallelized in the prior art. Furthermore, the aforementioned embodiment is described based on HPF (parallel processing language bases on FORTRAN 90). However, the present invention is not limited to such a specific programming language, but the invention can be applied to a voluntary language processing system which supports parallel processing in a multiple processor environment such as APL or C* (parallel language based on C). Furthermore, the loop which is the target of the present invention is extended to array calculations provided by do . . . enddo loop and FORTRAN 90 and to transformational intrinsic functions (TIFS) such as SPREAD and CSHIFT.

We claim:

1. In a computer having a plurality of processors, a method for generating code in a compiler by dividing loops in a source program among said plurality of processors so as to execute said loops in parallel, said method comprising the steps of:
   (a) reading said source program;
   (b) locating a loop wherein an index set associated with said loop can be distributed among said plurality of processors and wherein data dependency of a right side of an assignment expression within said loop is indefinite;
   (c) distributing the index set associated with said loop located at step (b) among said plurality of processors;
   (d) for said loop located in step (b), if an index variable associated with said loop is an internal loop index iteration variable of a nested loop determining at least one condition relating to said assignment expression;
   (e) calculating a receiving processor set in accordance with the determination made in step (d); and
   (f) generating code for communicating data to said receiving processor set in accordance with the receiving processor set calculated in step (e).

2. The method of claim 1, further comprising the step of:
   (g) generating pipelined code for each of said plurality of processors with respect to the determination made in step (d).

3. The method of claim 1, wherein said source program is written in FORTRAN.

4. The method of claim 3, wherein said source program includes a code for specifying number of processors and method for dividing said loops.

5. The method of claim 1, wherein said variable is of a form "#IV.d", wherein "#" indicates that said variable is an internal variable that only said compiler can use, "IV" indicates that said variable is a loop variable, and ".d" indicates that said variable is the d-th index variable of a nested loop.

6. The method of claim 5, wherein the step (c) of determining at least one condition relating to said assignment expression includes the step of identifying a first expression having an identical N-dimensional array A which appears on both sides of said expression in said loop, wherein
   (i) N is an integer not less than 1;
   (ii) an m-th subscript of array A on left side of said First expression is $c1*(\#IV.d)+c2$,
   wherein m is an integer greater than 1 and less than or equal to N, and c1 and c2 are loop-invariant constants in said innermost loop and c1 is not equal to 0;
   (iii) an m-th dimension of array A on left side of said first expression is distributed in blocks among said plurality of processors; and
   (iv) an m-th subscript expression x of array A on right side of said first expression is a variable whose value is indefinite at compile time but is invariable in said innermost loop at program execution time.

7. The method of claim 6, further comprising the step of:
   calculating and holding an upper limit ub and a lower limit lb of a subscript of loop operation for each of said plurality of processors in accordance with information on distribution of c1, c2, and said m-th subscript among said plurality of processors.

8. The method of claim 7, wherein step (e) calculates said receiving processor set in accordance with said upper limit ub and said lower limit lb of said subscripts in said loop operation in addition to said c1, c2 and x associated with each of said plurality of processors.

9. The method of claim 7, wherein step (e) calculates a first receiving processor set that should be communicated before said innermost loop and a second receiving processor set that should be communicated after said innermost loop in accordance with said upper limit ub and said lower limit lb of said subscripts in said loop operation in addition to said c1, c2 and x associated with each of said plurality of processors.

10. The method of claim 9, wherein step (f) includes the steps of:
   (i) generating code for communicating data to said first receiving processor set; and
   (ii) generating code for communicating data to said second receiving processor set.

11. The method of claim 7, further comprising the step of:
   generating pipelined code for each of said plurality of processors in accordance with said upper limit ub and said lower limit lb of said subscripts in said loop operation.

12. In a computer having a plurality of processors, a compiler for generating code so as to increase the speed of program execution by dividing the loop in the source program into a plurality of processors and executing the loop in parallel, said compiler comprises:
   means for reading said source program;
   means for locating a loop wherein an index set associated with said loop can be distributed among said plurality of processors and wherein data dependency of a right side of an assignment expression within said loop is indefinite;
   means for distributing the index set associated with said loop;
   if an index variable associated with said loop is an internal loon index iteration variable of a nested loop determining at least one condition relating to said assignment expression;
   means for calculating a receiving processor set in accordance with the determination of said at least one condition; and
   means for generating code for communicating data to said receiving processor set in accordance with the receiving processor set.

13. The compiler of claim 12, further comprising:
   means for generating pipelined code for each of said plurality of processors if an index variable associated with the loop is of a predetermined type, determining at least one condition relating to the assignment expression.

14. The compiler of claim 12, wherein said source program is written in FORTRAN.

15. The compiler of claim 14, wherein said source program includes a code for specifying number of processors and method for dividing said loops.

16. The compiler of claim 12, wherein said variable is of a form "#IV.d", wherein "#" indicates that said variable is an internal variable that only said compiler can use, "IV" indicates that said variable is a loop variable, and ".d" indicates that said variable is the d-th index variable of a nested loop.

17. The compiler of claim 16, wherein said means for determining at least one condition relating to said assignment expression includes means for identifying a first expression having an identical N-dimensional array A which appears on both sides of said expression in said loop, wherein
   (i) N is an integer not less than 1;
   (ii) an m-th subscript of array A on left side of said first expression is $c1*(\#IV.d)+c2$, wherein m is an integer greater than 1 and less than or equal to N, and c1 and c2 are loop-invariant constants in said innermost loop and c1 is not equal to 0;
   (iii) an m-th dimension of array A on left side of said first expression is distributed in blocks among said plurality of processors; and
   (iv) an m-th subscript expression x of array A on right side of said first expression is a variable whose value is indefinite at compile time but is invariable in said innermost loop at program execution time.

18. The compiler of claim 17, further comprising:
   means for calculating and holding an upper limit ub and a lower limit lb of a indice of loop operation for each of said plurality of processors in accordance with information on distribution of c1, c2, and said m-th indice among said plurality of processors.

19. The compiler of claim 18, wherein said calculating means calculates said receiving processor set in accordance with said upper limit ub and said lower limit lb of said subscripts in said loop operation in addition to said c1, c2 and x associated with each of said plurality of processors.

20. The compiler of claim 18, wherein said means for calculating a receiving processor set calculates a first receiving processor set that should be communicated before said innermost loop and a second receiving processor set that should be communicated after said innermost loop in accordance with said upper limit ub and said lower limit lb of said subscripts in said loop operation in addition to said c1, c2 and x associated with each of said plurality of processors.

21. The compiler of claim 20, wherein said means for generating code for communicating data to said receiving processor set includes:
   means generating code for communicating data to said first receiving processor set; and
   means for generating code for communicating data to said second receiving processor set.

22. The compiler of claim 18, further comprising:
   means for generating pipelined code for each of said plurality of processors in accordance with said upper limit ub and said lower limit lb of said subscripts in said loop operation.

23. A computer program device readable by a machine, tangibly embodying a program of instructions executable by a machine to perform method steps for generating code in a compiler, for a computer having a plurality of processors, by dividing loops in a source program among said plurality of processors so as to execute said loops in parallel, said method comprising the steps of:
   (a) reading said source program;
   (b) locating a loop wherein an index set associated with said loop can be distributed among said plurality of processors and wherein data dependency of a right side of an assignment expression within said loop is indefinite;
   (c) distributing the index set associated with said loop located at step (b) among said plurality of processors;
   (d) for said loop located in step (b), if an index variable associated with said loop is an internal loop index iteration variable of a nested loop determining at least one condition relating to said assignment expression;
   (e) calculating a receiving processor set in accordance with the determination made in step (d); and
   (f) generating code for communicating data to said receiving processor set in accordance with the receiving processor set calculated in step (e).

24. The method of claim 23, further comprising the step of:
   (g) generating pipelined code for each of said plurality of processors with respect to the determination made in step (d).

25. The method of claim 23, wherein said source program is written in FORTRAN.

26. The method of claim 25, wherein said source program includes a code for specifying number of processors and method for dividing said loops.

27. The method of claim 23, wherein said variable is of form "#IV.d", wherein "#" indicates that said variable is an internal variable that only said compiler can use, "IV" indicates that said variable is a loop variable, and ".d" indicates that said variable is the d-th index variable of a nested loop.

28. The method of claim 27, wherein step (c) of determining at least one condition relating to said assignment expression includes the step of identifying a first expression having an identical N-dimensional array A which appears on both sides of said expression in said loop, wherein
   (i) N is an integer not less than 1;
   (ii) an m-th subscript of array A on left side of said first expression is c1*(#IV.d)+c2, wherein m is an integer greater than 1 and less than or equal to 0;
   (iii) an m-th dimension of array A on left side of said first expression is distributed in blocks among said plurality of processors; and
   (iv) an m-th subscript express x of array A on right side of said first expression is a variable whose value is indefinite at compile time but is invariable in said innermost loop at program execution time.

29. The method of claim 28, further comprising the step of:
   calculating and holding an upper limit ub and a lower limit lb of a subscript of loop operation for each of said plurality of processors in accordance with information on distribution of c1, c2, and said m-th subscript among said plurality of processors.

30. The method of claim 29, wherein step (e) calculates said receiving processor set in accordance with said upper limit ub and said lower limit lb of said subscripts in said loop operation in addition to said c1, c2 and x associated with each of said plurality of processors.

31. The method of claim 29, wherein step (e) calculates a first receiving processor set that should be communicated before said innermost loop and a second receiving processor set that should be communicated after said innermost loop in accordance with said upper limit ub and said lower limit lb of said subscripts in said loop operation in addition to said c1, c2 and x associated with each of said plurality of processors.

32. The method of claim 31, wherein step (f) includes the steps of:
   (i) generating code for communicating data to said first receiving processor set; and
   (ii) generating code for communicating data to said second receiving processor set.

33. The method of claim 29, further comprising the step of:
   generating pipelined code for each of said plurality of processors in accordance with said upper limit ub and said lower limit lb of said subscripts in said loop operation.

* * * * *

UNITED STATES PATENT AND TRADEMARK OFFICE
CERTIFICATE OF CORRECTION

PATENT NO. : 6,016,397
DATED : January 18, 2000
INVENTOR(S) : Takeshi Ogasawara

Page 1 of 1

It is certified that error appears in the above-identified patent and that said Letters Patent is hereby corrected as shown below:

Column 2,
Line 49 and 50: "...a(m)..." should read -- ..a(m).. --

Column 3,
Line 18: "5-153895" should read -- 5-158895 --

Column 10,
Line 50: "a(i+I-1)=a(x)" should read -- a(i+M-1)=a(x) --

Column 11,
Line 26: "sub ptr," should read -- sub_ptr, --

Column 13,
Line 26: "pre ptr" should read -- pre_ptr --

Column 15,
Line 27: "loon" should read -- loop --

Signed and Sealed this

Fourth Day of September, 2001

Attest:

NICHOLAS P. GODICI
*Attesting Officer*     *Acting Director of the United States Patent and Trademark Office*